O. EPPENSTEIN.
SEPARATING PRISM SYSTEM.
APPLICATION FILED MAY 22, 1913.

1,142,755.  Patented June 8, 1915.

Witnesses:

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

SEPARATING-PRISM SYSTEM.

1,142,755.  Specification of Letters Patent.  Patented June 8, 1915.

Application filed May 22, 1913. Serial No. 769,277.

*To all whom it may concern:*

Be it known that I, OTTO EPPENSTEIN, a citizen of the German Empire, residing at Jena, Germany, have invented a new and useful Separating-Prism System, of which the following is a specification.

The present invention relates to separating prism systems, in which two glass bodies are in contact with each other with corresponding surfaces without being cemented together, one of the said bodies being recessed at one or more places on its contact-surface, so that in the other body at the corresponding place or places of its contact-surface total reflection takes place, as the said latter body is bounded by air at this place or those places. Such prism systems have, for instance, been used for photometers, where two sources of light are to be presented side by side for the purpose of being compared with one another. Should such systems be employed as the separating prism systems of telemeters, which instruments are frequently subjected to more or less violent shocks, the atmospheric pressure would not be sufficient to maintain the two bodies in contact with one another, but they would have to be pressed together by special fastening means, which would be accompained by the danger of deformations being caused in the glass bodies. According to the present invention no special fastening means are employed, the two glass bodies being held together solely by the atmospheric pressure. This is made possible, by one of the bodies being formed as a thin layer, so that, on any shock taking place, which might affect the system, the forces acting on this body are not sufficiently great to separate the two bodies from one another. In general it will be necessary to attach to that side of the thin layer, which is not in contact with the other glass body, a third glass body serving for the leading in and out of the rays of light. When the body having the recess or recesses is at the same time the one forming the thin layer, the recess or recesses may be allowed to extend through the whole thickness of the body, so that by this means it is divided into two or more parts. Hence, in this case the possibility is given, instead of providing the body, which forms the thin layer, with one or more recesses, of making it up of two or more separate parts, so that each space between two such parts represents a recess.

Figure 1:
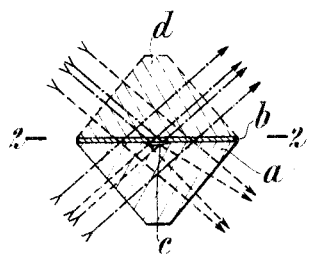
Figure 3:
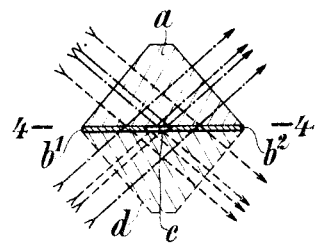
Figure 2:
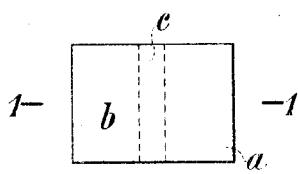
Figure 4:
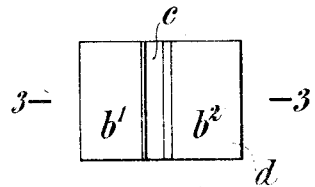

In the annexed drawing: Figure 1 is a section through an example of the prism according to the invention on line 1—1 of Fig. 2. Fig. 2 is a section on line 2—2 of Fig. 1. Fig. 3 is a section through a second example of such a prism on line 3—3 of Fig. 4. Fig. 4 is a section on line 4—4 of Fig. 3.

In both examples the glass bodies contact with one another in a plane. In Figs. 1 and 2 a glass body $a$ is provided on that one of its plane limiting surfaces, in which it contacts with a thin plate $b$, with a recess formed by a ground-in groove $c$. Of two ray pencil systems being directed toward this contact-surface, the one from above and the other from below, at a suitable angle, the mixed ray pencil system emerging upward contains, as is indicated in the drawing, only those rays of the pencil system coming from above, which at the contact-surface have impinged on the recess, while it contains of the pencil system coming from below only those rays, which have not impinged on the recess. A glass body $d$ indicated in Fig. 1 by dotted lines, makes it possible, to direct the rays coming from above toward the contact-surface at an angle of incidence, which is sufficiently great for total reflection at the recess $c$. As a connecting means between this latter body and the plate $b$ a yielding cement layer is employed, so that even considerable shocks, which might occur and to which the body $d$ might be subjected, are deadened by the said layer to such an extent that, when they reach the plate $b$, they are no longer strong enough to separate the plate $b$ from the body $a$.

In the second example, Figs. 3 and 4, the contact-surface again contains only one recess, this time in the body forming the thin layer. The recess is in this case formed by the two small plates $b^1$ and $b^2$, which are in contact with the glass body $a$, having between them a space $c$. The mixed ray pencil system emerging upward again contains of a pencil system, which is directed toward the contact-surface from above at a suitable angle, only those rays, which have impinged at the contact-surface on the space $c$ and have been reflected at this space, while it contains of a pencil system coming from below only those rays, which have not impinged on the said space. A glass body $d$ indicated in Fig. 3 by dotted lines is connected with the small plates $b^1$ and $b^2$ by means of a yielding cement layer and serves the purpose explained in the first example.

I claim:

1. In a separating prism system two glass bodies, one of which is a thin layer, which bodies are in contact with one another with corresponding surfaces without being cemented together, one of the said bodies being recessed on its contact-surface, which recessing is adapted to cause total reflection in the other body at the corresponding part of its contact-surface, and a third glass body, which is attached to that side of the thin layer, which is remote from the other of the said two glass bodies.

2. In a separating prism system two glass bodies, one of which is a thin layer, which bodies are in contact with one another with corresponding surfaces without being cemented together, the said thin layer being recessed on its contact-surface, which recessing is adapted to cause total reflection in the other body at the corresponding part of its contact-surface, and a third glass body, which is attached to that side of the thin layer, which is remote from the other of the said two glass bodies.

3. In a separating prism system two glass bodies, one of which is a thin layer, which bodies are in contact with one another with corresponding surfaces without being cemented together, the said thin plate being recessed on its contact-surface, which recessing is carried right through the said plate, thereby dividing it into more than one part, and is adapted to cause total reflection in the other body at the corresponding part of its contact-surface, and a third glass body, which is attached to that side of the thin layer, which is remote from the other of the said two glass bodies.

OTTO EPPENSTEIN.

Witnesses:
PAUL KRÜGER,
FRITZ SANDER.